United States Patent
Sachs et al.

(10) Patent No.: US 9,865,032 B2
(45) Date of Patent: Jan. 9, 2018

(54) FOCAL LENGTH WARPING

(71) Applicant: Adobe Systems Incorporated, San Jose, CA (US)

(72) Inventors: Ian D. Sachs, San Francisco, CA (US); Elya Shechtman, Seattle, WA (US); Daniel R. Goldman, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 229 days.

(21) Appl. No.: 14/845,510

(22) Filed: Sep. 4, 2015

(65) Prior Publication Data

US 2017/0069056 A1 Mar. 9, 2017

(51) Int. Cl.
| | |
|---|---|
| *G06T 3/00* | (2006.01) |
| *G06T 7/00* | (2017.01) |
| *G06T 17/20* | (2006.01) |
| *G06K 9/00* | (2006.01) |
| *H04N 5/232* | (2006.01) |

(52) U.S. Cl.
CPC ........ *G06T 3/0093* (2013.01); *G06K 9/00201* (2013.01); *G06K 9/00281* (2013.01); *G06T 7/0069* (2013.01); *G06T 17/20* (2013.01); *H04N 5/23219* (2013.01); *G06T 2207/20104* (2013.01); *G06T 2207/20132* (2013.01); *G06T 2207/30201* (2013.01); *G06T 2210/44* (2013.01)

(58) Field of Classification Search
CPC ..... G06T 3/0093; G06T 7/0069; G06T 17/20; G06T 2210/44; G06T 2207/20104; G06T 2207/30201; G06T 2207/20132; G06K 9/00201; G06K 9/00281; H04N 5/23219

USPC .......................................................... 348/77
See application file for complete search history.

(56) References Cited

U.S. PATENT DOCUMENTS

| | | | | |
|---|---|---|---|---|
| 2004/0222987 | A1* | 11/2004 | Chang | G01B 11/2509 345/419 |
| 2005/0190972 | A1* | 9/2005 | Thomas | G06K 9/209 382/218 |
| 2015/0294189 | A1* | 10/2015 | Benhimane | G06K 9/623 382/195 |
| 2017/0024907 | A1* | 1/2017 | Bermano | G06T 11/003 |

OTHER PUBLICATIONS

Burgos-Artizzu,"Distance estimation of an unknown person from a portrait", In Computer Vision ECCV 2014, 2014, 16 pages.
Chien-Ping,"Fast and globally convergent pose estimation from video images", IEEE Trans. Pattern Anal. Mach. Intell., 22(6):610{622, Jun. 2000., Feb. 18, 1998, 26 pages.
(Continued)

*Primary Examiner* — Zhihan Zhou
(74) *Attorney, Agent, or Firm* — Wolfe-SBMC

(57) ABSTRACT

Techniques for focal length warping are described. Focal length warping, for instance, may provide an automated approach for correcting distortion in an input image to improve its perceptual quality. In at least some implementations, a focal length of a camera lens used to capture an image and an estimated camera distance are utilized to three-dimensionally reproject and warp the image to generate an adjusted image simulating a new focal length and a new camera distance. Implementations of focal length warping may estimate a camera distance based on facial features in an image.

20 Claims, 15 Drawing Sheets

(56) References Cited

OTHER PUBLICATIONS

Cooper, "The perceptual basis of common photographic practice", Journal of Vision, 12(5), May 2012., May 2012, 26 pages.
Igarashi, "As-Rigid-As-Possible Shape Manipulation", ACM Transactions on Graphics 2005, 2005, 8 pages.
Jacobson, "Bounded Biharmonic Weights for Real-Time Deformation", In ACM SIGGRAPH 2011 Papers, SIGGRAPH '11, 2011, 8 pages.
Katz, "Direct Visibility of Point Sets", ACM Trans. Graph., 26(3), Jul. 2007, 12 pages.
Saragih, "Face Alignment through Subspace Constrained Mean-Shifts", In International Conference of Computer Vision (ICCV), Sep. 2009, 8 pages.
Vlasic, "Face Transfer with Multilinear Models", Proceedings of ACM SIGGRAPH, vol. 24, Jul. 2005, 9 pages.
Yang, "Expression Flow for 3D-Aware Face Component Transfer", ACM Trans. Graph. 30, 4, Article 60, Jul. 2011., 2011, 10 pages.

\* cited by examiner

600

FOCAL LENGTH WARPING

BACKGROUND

Images (whether digital images or conventional film images) captured by photographers often contain perspective distortions. For instance, the focal length of a lens used to capture an image determines the angle of view of the image, and may cause expansion or compression in the apparent depth of the image, which may conflict with expectations of human perception. Further, an image captured with lenses of different focal lengths may exhibit different and sometimes undesirable visual characteristics. Thus, determining an optimal focal length for capturing and displaying an image presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for focal length warping are described. Focal length warping may provide an automated approach for correcting distortion in an input image to improve its perceptual quality. In at least some implementations, a focal length of a camera lens used to capture an image and an estimated camera distance are utilized to three-dimensionally reproject and warp the image in order to generate an adjusted image simulating a new focal length and a new camera distance Implementations of focal length warping may estimate a camera distance based on facial features in an image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
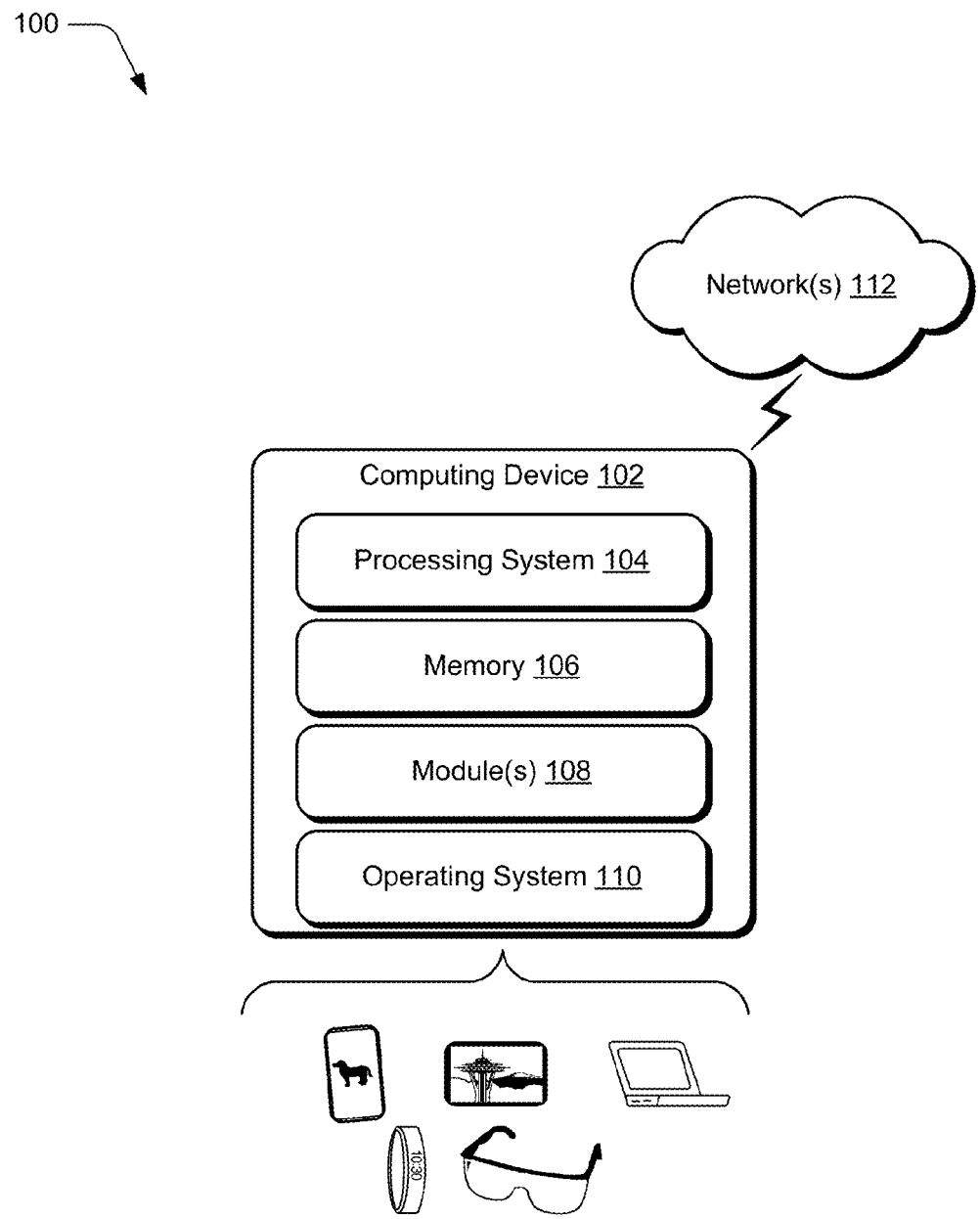
FIG. 1 is an illustration of an environment in an example implementation that is operable to employ techniques discussed herein in accordance with one or more implementations.

A large portion of consumer photos contain human faces. However, photos taken by amateur photographers are often taken using a lens with a focal length that may cause undesirable expansion or compression in the apparent depth of the image. In particular, the focal length used to photograph a human face may make the face appear wider or narrower, and may affect perceived personality such as intellect or aggression of the subject.

Accordingly, techniques for focal length warping are described. For example, a focal length warping technique may make an image appear as if captured with a different focal length and distance than actually used in capturing the image. According to various implementations, a focal length of a camera lens used to capture an image and estimated camera distances are utilized to reproject and warp the image to generate an adjusted image simulating a new focal length and a new camera distance.

In at least some implementations, the focal length of the camera lens used to capture an image is determined, such as based on metadata of the image. For example, exchangeable image file format ("EXIF") data for the image is inspected to ascertain the focal length. Further, camera distances relative to different points within the image when the image was captured may be estimated by locating facial features in the image and utilizing a trained regression function that determines camera distances based on facial features. In at least some implementations, a simulated three-dimensional ("3D") mesh is fitted to the facial features, and the 3D mesh is reprojected to a new focal length and new camera distance. An adjusted image may be generated by warping the image based on differences between corresponding locations in the original 3D mesh and the reprojected 3D mesh.

Thus, implementations provide ways of correcting perspective distortions in images without requiring that the image be re-captured from a different location or with a different lens. Such implementations may allow a user to create images that appear to be professionally captured without perspective distortion and without requiring professional knowledge or expertise. Further, such implementations may reduce the need for specialized equipment, allowing users to reduce perspective distortion without the cost and hassle of variable or interchangeable lenses.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for focal length warping in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for focal length warping described herein. The environment 100 includes a computing device 102 which may be configured in a variety of ways.

The computing device 102, for instance, may be configured as any type of client or user device that includes fixed or mobile, wired and/or wireless devices. For example, the computing device 102 may be a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). One of a variety of different examples of the computing device 102 is shown and described below in FIG. 15.

The computing device 102 is illustrated as including a variety of hardware components, examples of which include a processing system 104 and an example of a computer-readable storage medium illustrated as a memory 106. The processing system 104 is representative of functionality to perform operations through execution of instructions stored in the memory 106. Although illustrated separately, functionality of these components may be further divided, combined (e.g., on an application specific integrated circuit), and so forth. The computing device 102 of FIG. 1 further includes module(s) 108 that may implement one or more of the techniques for focal length warping as illustrated in FIG. 2.

The computing device 102 is further illustrated as including an operating system 110. The operating system 110 is configured to abstract underlying functionality of the computing device 102 to the module(s) 108. For example, the operating system 110 may abstract the processing system 104, the memory 106, and/or a network 112 functionality of the computing device 102 such that the module(s) 108 may be written and/or operate without knowing "how" this underlying functionality is implemented. The module(s) 108, for instance, may provide data to the operating system 110 to be rendered and displayed without understanding how this rendering will be performed. The operating system 110 may also represent a variety of other functionality, such as to manage a file system and user interface that is navigable by a user of the computing device 102.

The network 112 is representative of one or more wired and/or wireless networks that provide the computing device 102 with connectivity to various other networks, services, and/or entities. The network 112 may provide the computing device 102 with connectivity via a variety of different connectivity technologies, such as broadband cable, digital subscriber line (DSL), wireless data connectivity (e.g., WiFi™), T-carrier (e.g., T1), Ethernet, cellular data connectivity, and so forth.

Figure 2:
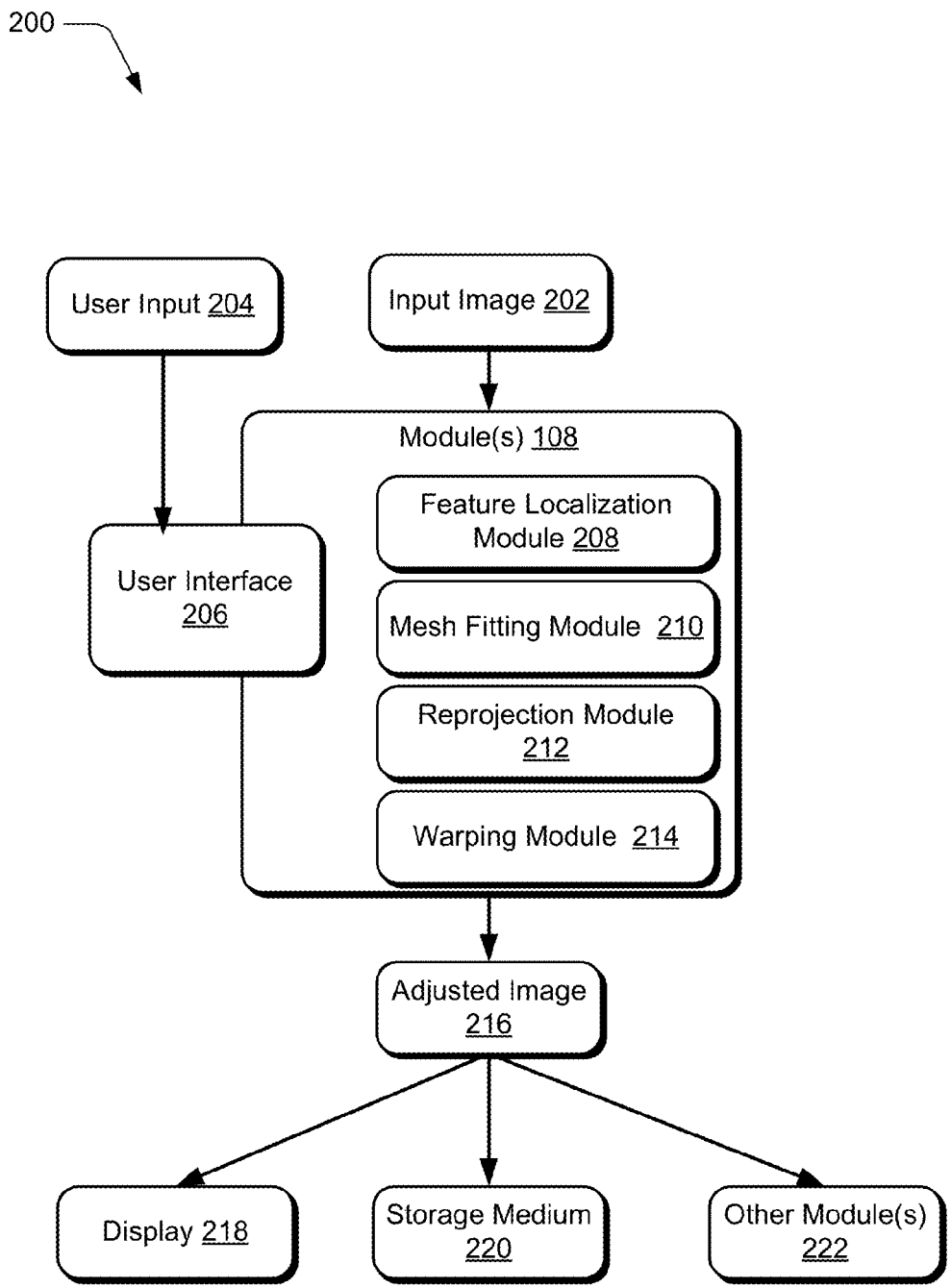
FIG. 2 is an illustration of an environment in an example implementation that is operable to employ techniques for focal length warping discussed herein in accordance with one or more implementations.

FIG. 2 is an illustration of an environment 200 in an example implementation that is operable to employ techniques for focal length warping described herein. According to various implementations, the environment 200 represents an extension of the environment 100. For instance, the module(s) 108 introduced above may implement one or more of the techniques for focal length warping as illustrated in FIGS. 3-14.

The module(s) 108 receive as input an input image 202, including an image that contains facial features. For example, the module(s) 108 can receive data representing captured images from a camera or other image capture device. Input received by the module(s) 108 can include various other types of input, such as portions of captured images, data identifying objects in captured images, and so forth. In some implementations, the module(s) 108 may receive a user input 204 via a user interface 206 specifying one or more parameters for a focal length warping technique as described herein. The module(s) 108 include a feature localization module 208 representing logic that obtains the locations of facial features from the input image 202, and a mesh fitting module 210 representing logic that determines a focal length used to capture the input image 202 and fits a 3D facial mesh to the input image 202 based on the located facial features. The module(s) 108 further include a reprojection module 212 representing logic that estimates new camera parameters as described herein, and applies the new camera parameters to reproject the 3D facial mesh. The module(s) 108 may also include a warping module 214 representing logic that warps the input image 202 based on differences in location between corresponding points in the fitted 3D facial mesh projected at the original focal length and the 3D facial mesh reprojected at the desired focal length, and generate as output an adjusted image 216. The adjusted image 216 may, for example, be displayed on a display device 218, stored to a storage medium 220 (such as the memory 106), and/or passed on to one or more other modules 222 for additional processing. In some implementations, the module(s) 108 may crop the warped image prior to outputting the adjusted image 216.

According to various implementations, the module(s) 108, the feature localization module 208, the mesh fitting module 210, the reprojection module 212, the warping module 214, or one or more other modules or techniques for focal length warping may be implemented as a cloud-based service (e.g., software as a service (SaaS)), plug-in(s) for applications, as library functions, as a stand-alone application, and so forth.

Having described an example environment in which the techniques described herein may operate, consider now a discussion of some example implementation scenarios in accordance with one or more implementations.

Example Implementation Scenarios

The following discussion describes example implementation scenarios for focal length warping in accordance with one or more implementations. In portions of the following discussion, reference will be made to the environment 100 of FIG. 1 and the environment 200 of FIG. 2.

Figure 3:
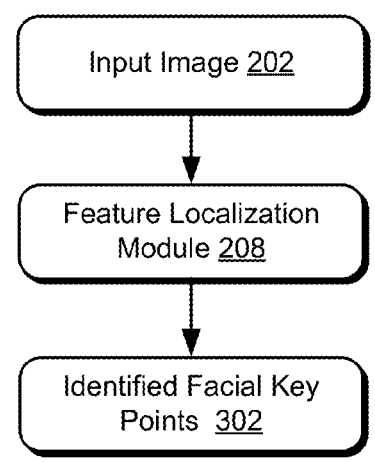
FIG. 3 illustrates an example implementation scenario for locating facial features in an input image in accordance with one or more implementations.

FIG. 3 illustrates an example implementation scenario 300 for locating facial features in an input image in accordance with one or more implementations.

The scenario 300 of FIG. 3 includes one or more images that are captured and provided as the input image 202 to the feature localization module 208. For example, the computing device 102 captures or receives through the network 112 the input image 202 including an image that contains facial features. In implementations, the feature localization module 208 is configured to identify and locate facial key points in the input image 202. The feature localization module 208 may output data representing identified facial key points 302, with or without the input image 202. For example, the feature localization module 208 may output data as stand-alone coordinates for the identified facial key points 302, or alternatively may output the identified facial key points 302 as locations embedded within metadata accompanying the input image 202.

Figure 4:
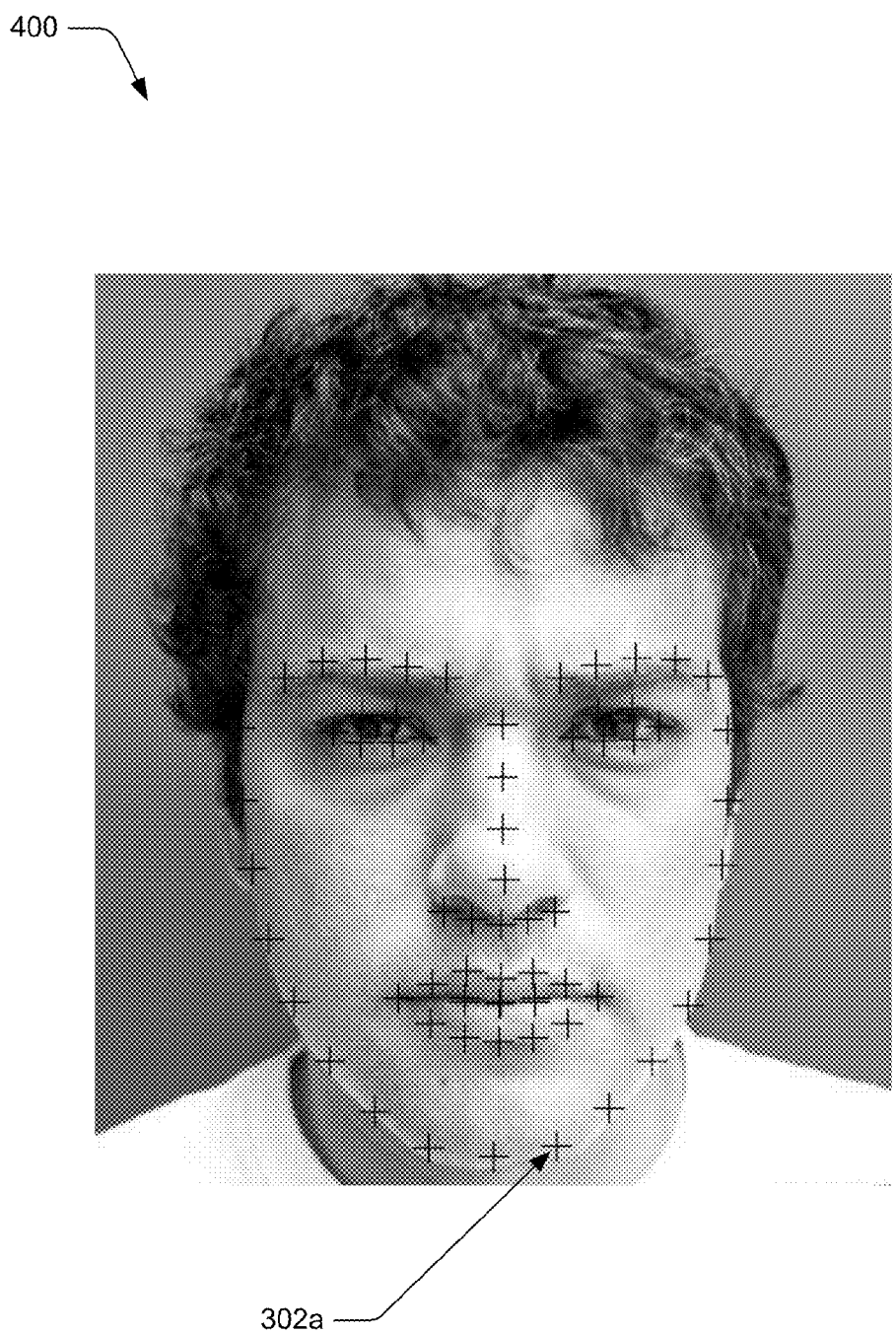
FIG. 4 illustrates example identified facial key points on an image.

FIG. 4 illustrates example identified facial key points on an image 400. The image 400 depicts an input image wherein facial key points are identified, as illustrated by the black crosses in the image 400. For clarity of illustration, a single identified facial key point 302a is labeled in the image 400. Facial key points correspond to pre-determined, common locations on a face, such as points describing a location of an eye, a nose, an eyebrow, a mouth, and/or a jawline, as illustrated in the image 400.

Figure 5:
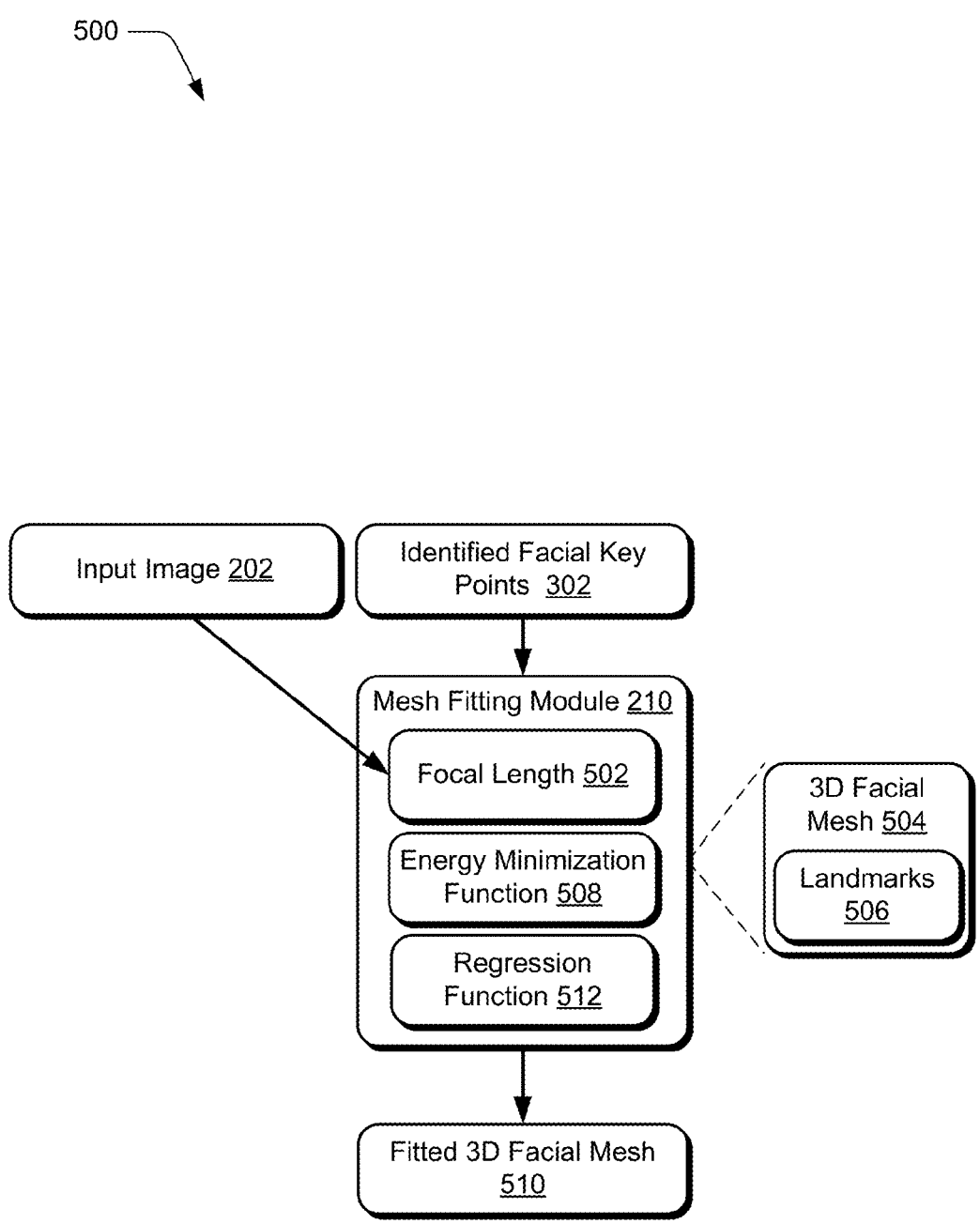
FIG. 5 illustrates an example implementation scenario for fitting a 3D facial mesh to identified facial key points in accordance with one or more implementations.

FIG. 5 illustrates an example implementation scenario 500 for fitting a 3D facial mesh to identified facial key points in accordance with one or more implementations. According to various implementations, the scenario 500 represents a continuation and/or extension of the scenario 300.

The scenario 500 of FIG. 5 includes the input image 202 and the identified facial key points 302 that are provided as an input to the mesh fitting module 210. The mesh fitting module 210 determines a focal length 502 of a camera lens used to capture an image. The focal length 502 may be determined by any suitable means, such as by extracting information from metadata corresponding to the image. For example, EXIF data for the image may include the 35 mm-equivalent focal length used in capturing the image. Additionally or alternatively, metadata for the image may include manufacturer and/or model information for the camera used to capture the image, and a lookup table may be utilized to determine the focal length of lenses used in the identified camera model. Alternatively, the focal length 502 may be determined by an input such as a user input indicating the focal length and/or the camera model.

The identified facial key points 302 are compared against a 3D facial mesh 504. An example of the 3D facial mesh 504 is shown as a 3D facial mesh 600 in FIG. 6. The 3D facial mesh 504 contains facial landmarks 506. Each of the facial landmarks 506 is a facial feature that corresponds to a 3D vertex location on the 3D facial mesh 504. The 3D facial mesh 504 may be rotated, translated, and/or deformed in order to better fit the locations of the facial landmarks 506 to the locations of the identified facial key points 302.

The identified facial key points 302 and the facial landmarks 506 of the 3D facial mesh 504 are input to an energy minimization function 508. The energy minimization function 508 contains an object-space fitting term and a regularization term, and solves for rotation, translation, and deformation coefficients for the 3D facial mesh, subject to constraints such as subspace constraints as discussed further below with respect to FIG. 13. Rotation, translation, and deformation coefficients for the 3D facial mesh 504 determine how to rotate, translate, and/or deform the 3D facial mesh 504. A fitted 3D facial mesh 510 determined by the energy minimization function 508 has the facial landmarks 506 with locations having a close correspondence to the locations of the identified facial key points 302 as well as a close correspondence to a constraining subspace. The constraining subspace is created through previous sampling of facial features in a plurality of images, and ensures that deformed 3D vertex locations maintain a similarity to an actual human face. The mesh fitting module 210 may output the fitted 3D facial mesh 510 with or without the corresponding input image.

The mesh fitting module 210 may also estimate a camera distance based on the identified facial key points 302. A regression function 512 is trained to learn the mapping from facial shapes to the distance to a face based on the locations of facial key points. The inverse distance to a face may be utilized to avoid saturation after a threshold distance, because at large distances the difference in the shape of a face becomes negligible with respect to the change in distance. The training of the regression function 512 may include as input a plurality of faces, with each face including several images taken from varied and known distances. The identified facial key points 302 are provided as an input to the regression function 512, and the regression function 512 calculates the camera distance. The camera distance in conjunction with the fitted 3D facial mesh 510 gives depth information relative to the camera for each 3D vertex of the fitted 3D facial mesh 510.

Figure 6:
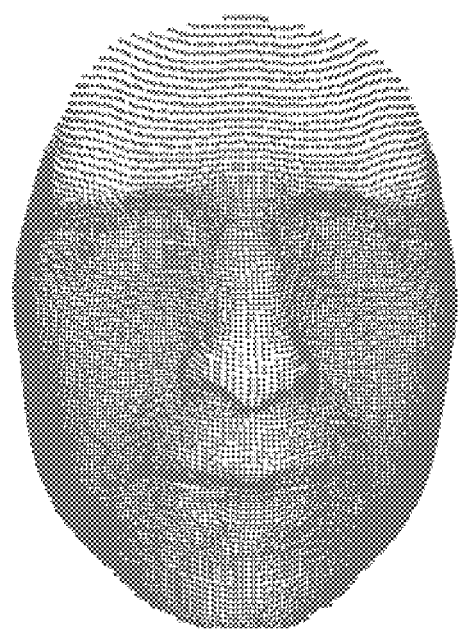
FIG. 6 illustrates an example 3D facial mesh.

FIG. 6 illustrates an example 3D facial mesh 600 in accordance with one or more implementations. The 3D facial mesh 600, for instance, represents the 3D facial mesh 504 before it is input to the mesh fitting module 210.

Figure 7:
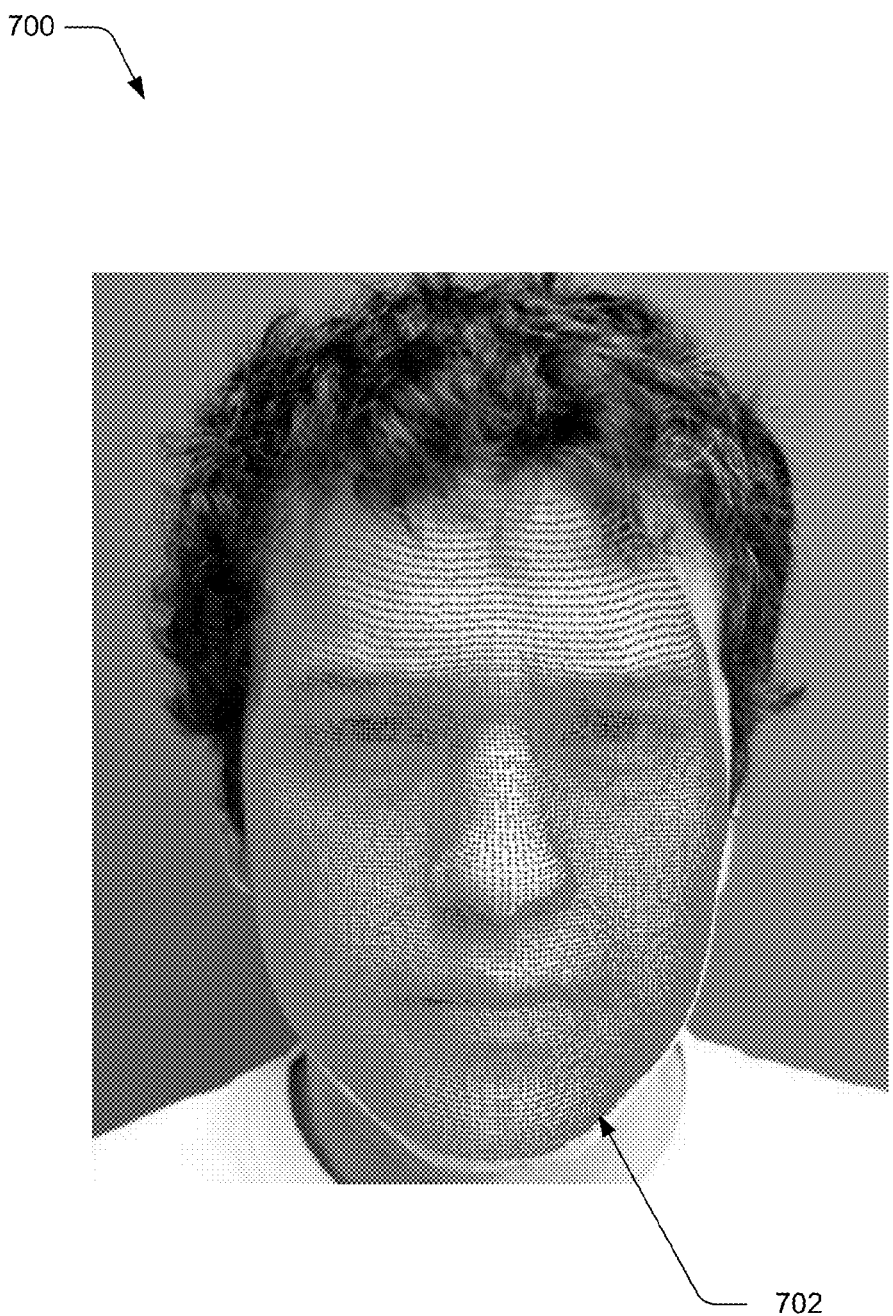
FIG. 7 illustrates an example 3D facial mesh fitted to an input image.

FIG. 7 illustrates an example 3D facial mesh fitted to an input image in accordance with one or more implementations. An image 700 depicts an image wherein a fitted 3D facial mesh 702 has been created by fitting the 3D facial mesh 600 of FIG. 6 to the input image of FIG. 4. For example, the input image may be the input image 202, the 3D facial mesh 600 may be the 3D facial mesh 504, and the fitted 3D facial mesh 702 is the fitted 3D facial mesh 510. The identified facial key points 302 of FIG. 4 are paired with the 3D vertex locations of landmarks in the fitted 3D facial mesh 702. Accordingly, the 3D facial mesh 600 is fitted to the input image as depicted in the image 700, and depth information is known for each 3D vertex location of the fitted 3D facial mesh 702.

Figure 8:
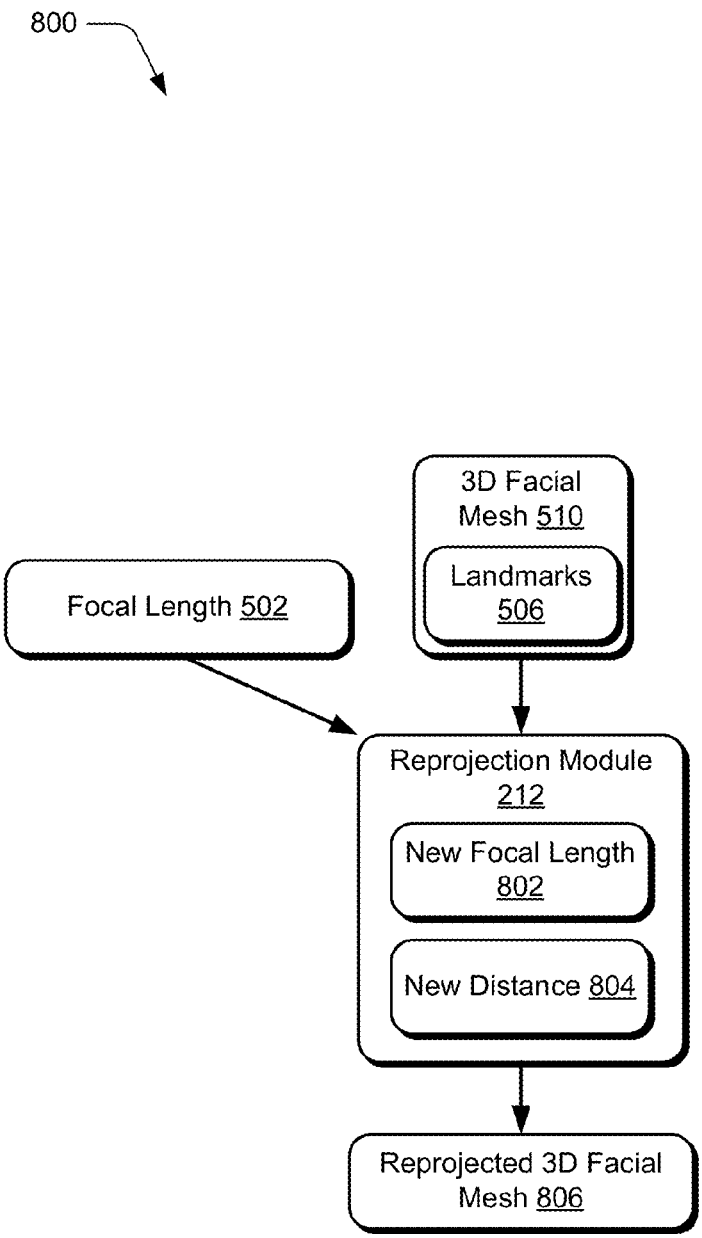
FIG. 8 illustrates an example implementation scenario for reprojecting a 3D facial mesh to a new focal length and new distance in accordance with one or more implementations.

FIG. 8 illustrates an example implementation scenario 800 for reprojecting a 3D facial mesh to a new focal length and new camera distance in accordance with one or more implementations. According to various implementations, the scenario 800 represents a continuation and/or extension of the scenarios 300 and/or 500.

The scenario 800 of FIG. 8 includes the fitted 3D facial mesh 510 provided as input to the reprojection module 212. With a known focal length 502 ($f_r$) and distance information associated with the fitted 3D facial mesh 510, such as the distance and/or depth information discussed above with respect to FIG. 5, the reprojection module 212 may define a pinhole camera model. Generally, a pinhole camera model represents a relationship between 3D points and their projection onto a 2D image plane of an ideal pinhole camera. An ideal pinhole camera has an aperture described as a single point. Using the pinhole camera model, the fitted 3D facial mesh 510 including the 3D vertex locations of the facial landmarks 506 is reprojected according to a new focal length 802 ($f_i$). However, a change in the focal length may alter the magnification of the image, so a virtual camera representing the pinhole camera in the pinhole camera model can be virtually dollied to a new distance 804 to preserve a relative size of subjects of the image. For example, an increase in focal length will increase the magnification and make the image appear 'zoomed-in,' so the virtual camera is dollied to a new distance farther away from the subject of the image to 'zoom-out' the image so that subjects in the image appear with a similar size compared to the original image. In some implementations, the virtual camera is dollied a distance corresponding to the ratio $f_r/f_i$.

The fitted 3D facial mesh 510 includes depth information for each 3D vertex location, and the 3D facial mesh may include 3D vertex locations at varied distances from the virtual camera. When the 3D facial mesh is reprojected onto the 2D image plane with the new focal length 802 and the new distance 804, each individual 3D vertex location is reprojected based on the corresponding distance and/or depth between the individual 3D vertex location and the virtual camera. After the 3D facial mesh has been reprojected onto the 2D image plane by reprojecting each individual 3D vertex location, the reprojection module 212 may then output a reprojected 3D facial mesh 806.

Figure 9:
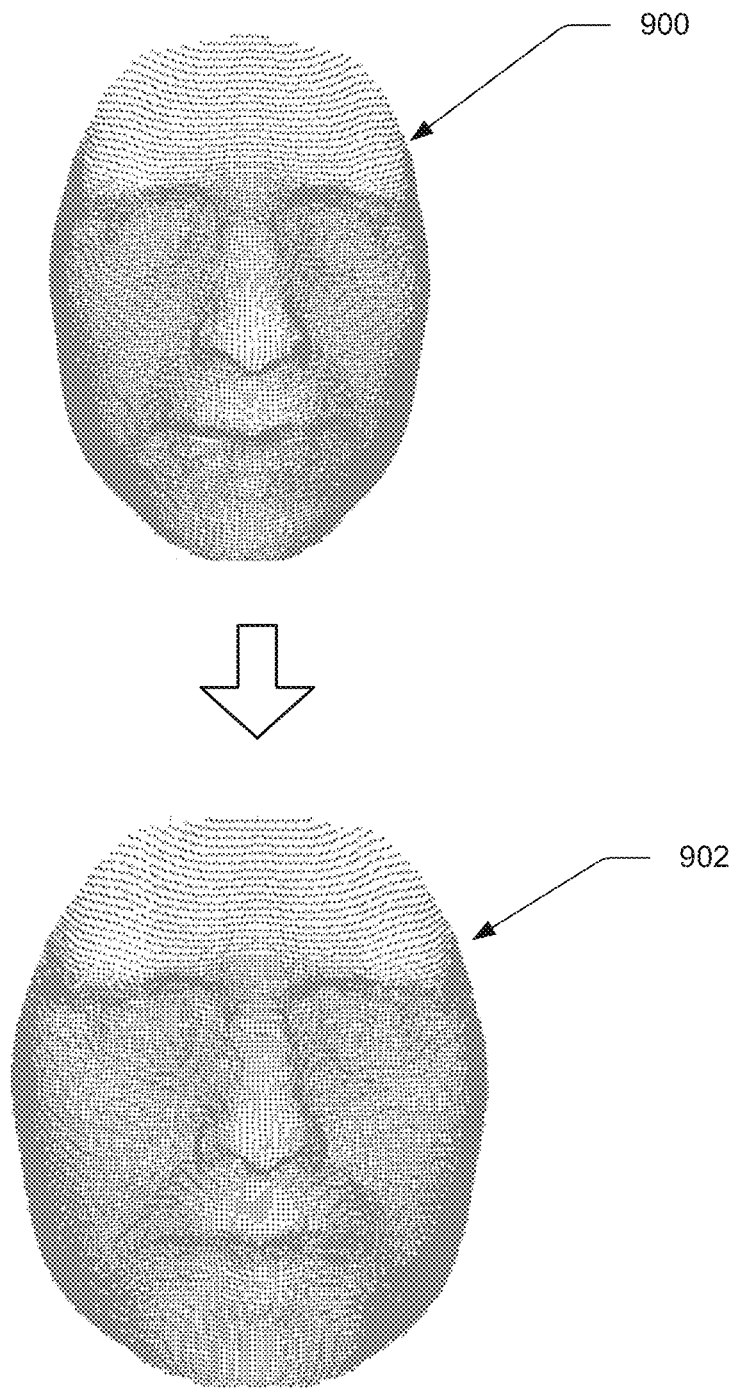
FIG. 9 illustrates an example reprojection technique applied to a 3D facial mesh.

FIG. 9 illustrates an example reprojection technique applied to a 3D facial mesh. FIG. 9 depicts a 3D facial mesh 900 prior to a reprojection technique being applied. An example reprojection technique as described above is applied to the 3D facial mesh 900, resulting in a reprojected 3D facial mesh 902. The apparent depth of the reprojected 3D facial mesh 902 is decreased compared to the 3D facial mesh 900.

Figure 10:
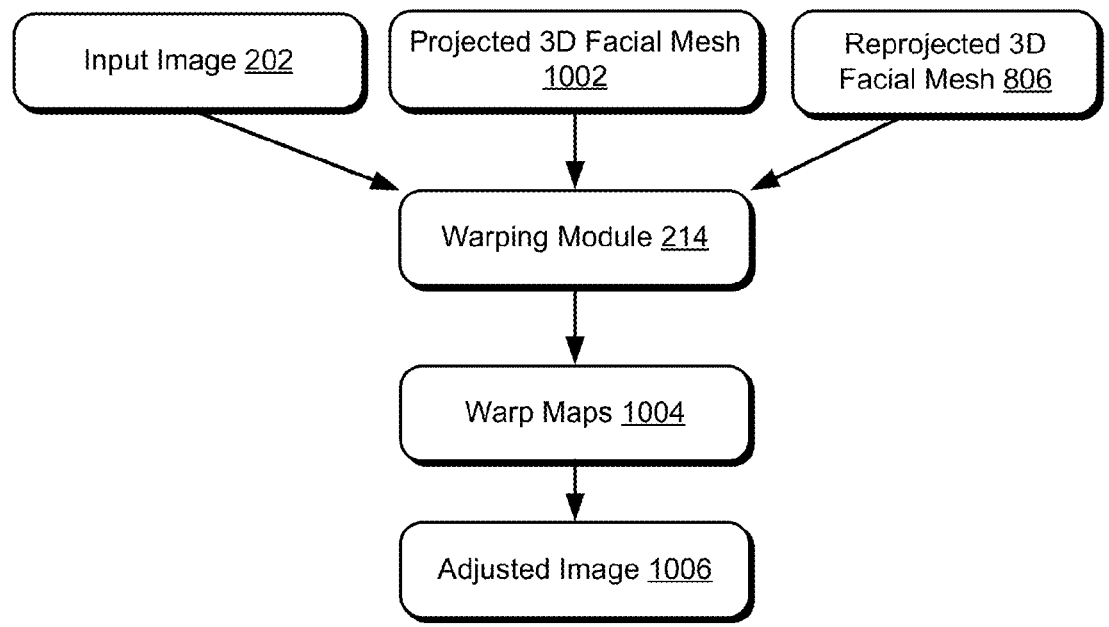
FIG. 10 illustrates an example implementation scenario for warping an image in accordance with one or more implementations.

FIG. 10 illustrates an example implementation scenario 1000 for warping an image in accordance with one or more implementations. According to various implementations, the scenario 1000 represents a continuation and/or extension of the scenarios 300, 500, and/or 800.

The scenario 1000 of FIG. 10 includes the input image 202, a projected 3D facial mesh 1002, and the reprojected 3D facial mesh 806 that are provided as input to the warping module 214. The projected 3D facial mesh 1002 may be the fitted 3D facial mesh 510 that has been projected onto a 2D image plane. A pinhole camera model is created using the original focal length and distance, and the pinhole camera model is used to determine pixel coordinates for each vertex of the fitted 3D facial mesh 510 on the 2D image plane such as the input image, creating the projected 3D facial mesh 1002. A different pinhole camera model is created using the new focal length and the new distance (e.g., as determined above), and the different pinhole camera model is used to determine pixel coordinates for each vertex of the reprojected 3D facial mesh 806, such as discussed above with respect to FIG. 8. A delta value for each vertex is determined based on differences in the pixel locations of corresponding vertices in the projected 3D facial mesh 1002 and the reprojected 3D facial mesh 806. The delta values may then be utilized to generate warp maps 1004 for the image. Generally, the warp maps 1004 describe a destination location for each pixel in the image determined by and/or based on the determined delta values.

In some situations, specific vertices may be inconsistent mathematically and/or inconsistent with human expectations of perception. For example, adjacent vertices may have delta values indicating movement in opposite or undesirable directions. Often, these situations are caused due to occluded or obscured vertices. For example, a forehead vertex of a 3D mesh may be behind hair in an image, or a cheekbone vertex of a 3D mesh may be obscured by the nose of a subject if the image were taken at a severe angle relative to the face. Such occluded vertices and corresponding delta values may be eliminated and removed prior to generating the warp maps 1004.

According to various implementations, the warping module 214 generates the warp maps 1004 based on the delta values at each pixel. Optionally, auxiliary data points may be added to the edges of the input image 202, setting delta values for edge pixels of the input image 202 to be equal to the delta value of the vertex nearest to the edge. For example, delta values for edge pixels on the right edge of the image may be set equal to the delta value of the right-most vertex of the 3D facial mesh, delta values for edge pixels on the top edge of the image may be set equal to the delta value of the top-most vertex of the 3D facial mesh, and so forth. The warping module 214 interpolates the delta values to generate delta values for each pixel of the image and the warping module 214 utilizes these delta values to generate the warp maps 1002. Example warp maps are shown as images 1100 and 1102 in FIG. 11. Using the warp maps 1004, an inverse look up is performed to obtain output pixel values based on the input image 202, thus warping the pixels and generating an adjusted image 1006.

Figure 11:
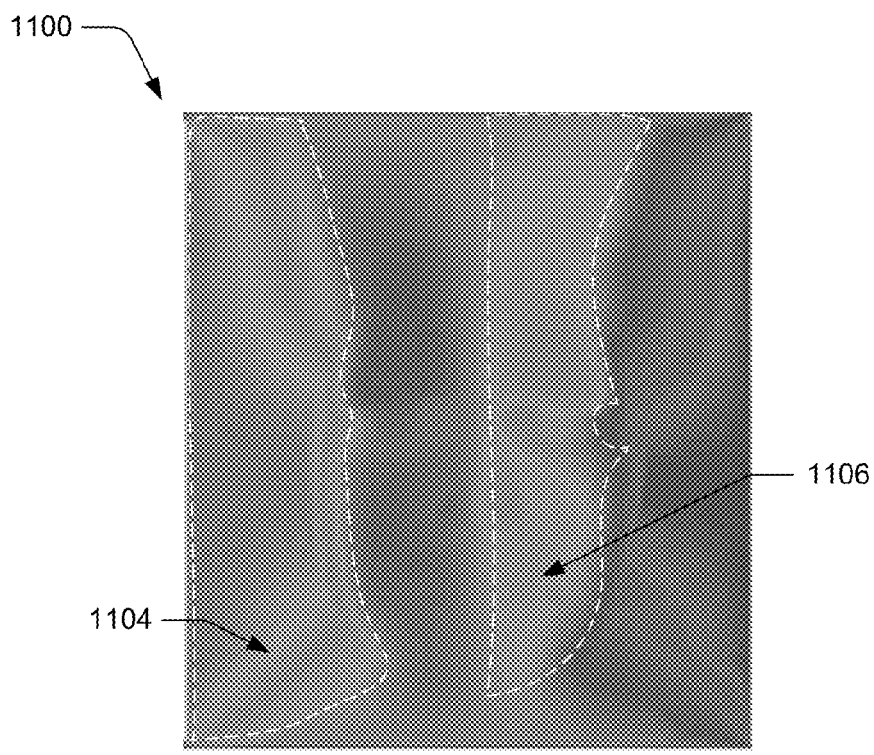
FIG. 11 illustrates example warp maps.
Figure 11:
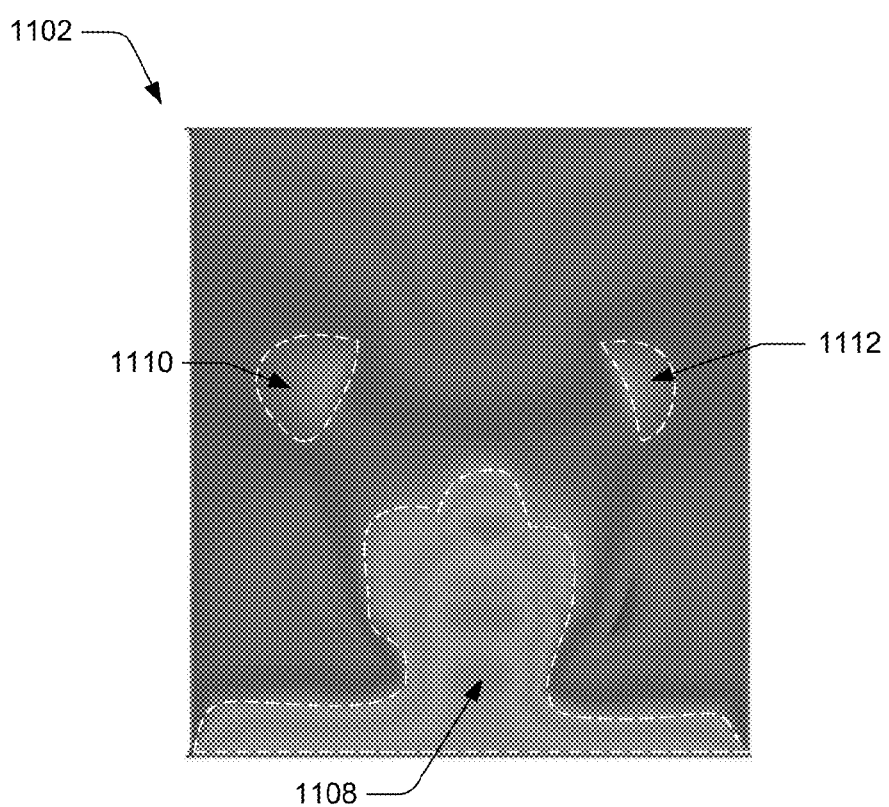

FIG. 11 illustrates example warp maps. The image 1100 depicts an X-coordinate warp map. The colors of pixels in the image 1100 indicate the distance that each pixel is to be moved along an X-axis of the image. Darker pixels indicate a movement toward the right side of the image, while lighter pixels indicate a movement toward the left side of the image. For example, lighter regions 1104 and 1106 of the image 1100 generally indicate a movement toward the left side of the image 1100, while darker regions of the image 1100 outside of the regions 1104, 1106 generally indicate a movement toward the right side of the image 1100.

The image 1102 depicts a Y-coordinate warp map. The colors of pixels in the image 1102 indicate the distance that each pixel is to be moved along a Y-axis of the image. Darker pixels indicate a movement toward the bottom of the image, while lighter pixels indicate a movement toward the top of the image. For example, lighter regions 1108, 1110, and 1112 of the image 1102 generally indicate a movement toward the top of the image 1102, while darker regions of the image 1102 outside of the regions 1108, 1110, and 1112 generally indicate a movement toward the bottom of the image 1102.

Figure 12:
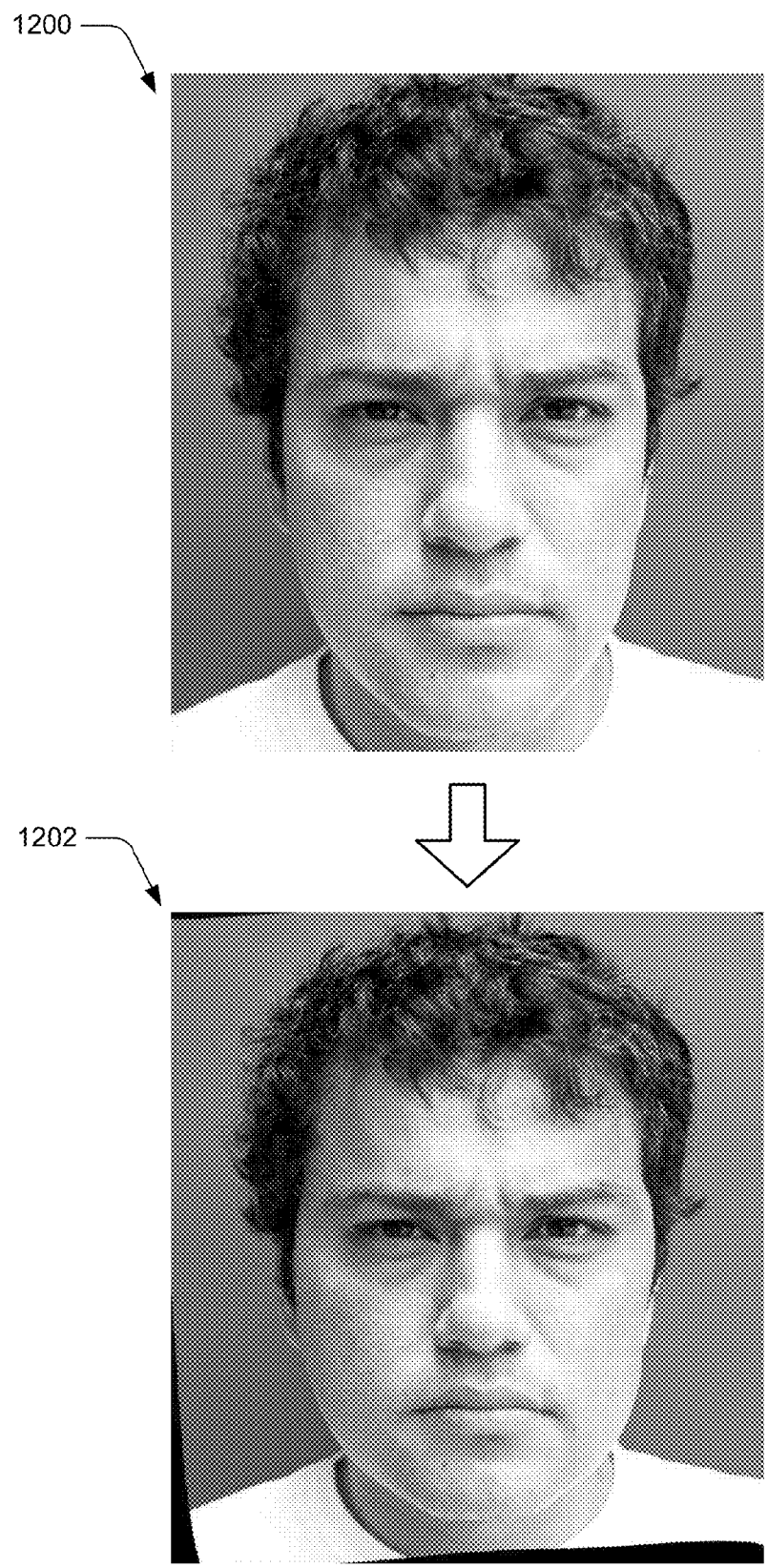
FIG. 12 illustrates example results of an image that has been adjusted with a focal length warping technique.

FIG. 12 illustrates example results of an image that has been adjusted with a focal length warping technique. An image 1200 depicts an input image to the techniques. For example, the image 1200 may be the input image 202 of FIGS. 2, 3, and/or 10. An image 1202 depicts an adjusted image that is the output image of a focal length warping technique that has been applied to the image 1200. For example, the image 1202 may be the adjusted image 1006 of FIG. 10.

Example Procedures

The following section describes some example procedures for focal length warping in accordance with one or more implementations. The procedures, for instance, describe example ways of implementing various aspects of the example implementation scenarios described above. This is not to be construed as limiting, however, and the procedures may be employed in a variety of other implementation scenarios within the spirit and scope of the claimed implementations.

The procedures described herein may be used separately or in combination with each other, in whole or in part. These procedures are shown as sets of operations (or acts) performed, such as through one or more entities or modules, and are not necessarily limited to the order shown for performing the operation. The example procedures may be employed in the environment 100 of FIG. 1, the environment 200 of FIG. 2, the system 1500 of FIG. 15, and/or any other suitable environment. According to one or more implementations, the procedures describe example ways for performing various aspects of the example implementation scenarios described herein. In at least some implementations, steps described for the various procedures are implemented automatically and independent of user interaction.

Figure 13:
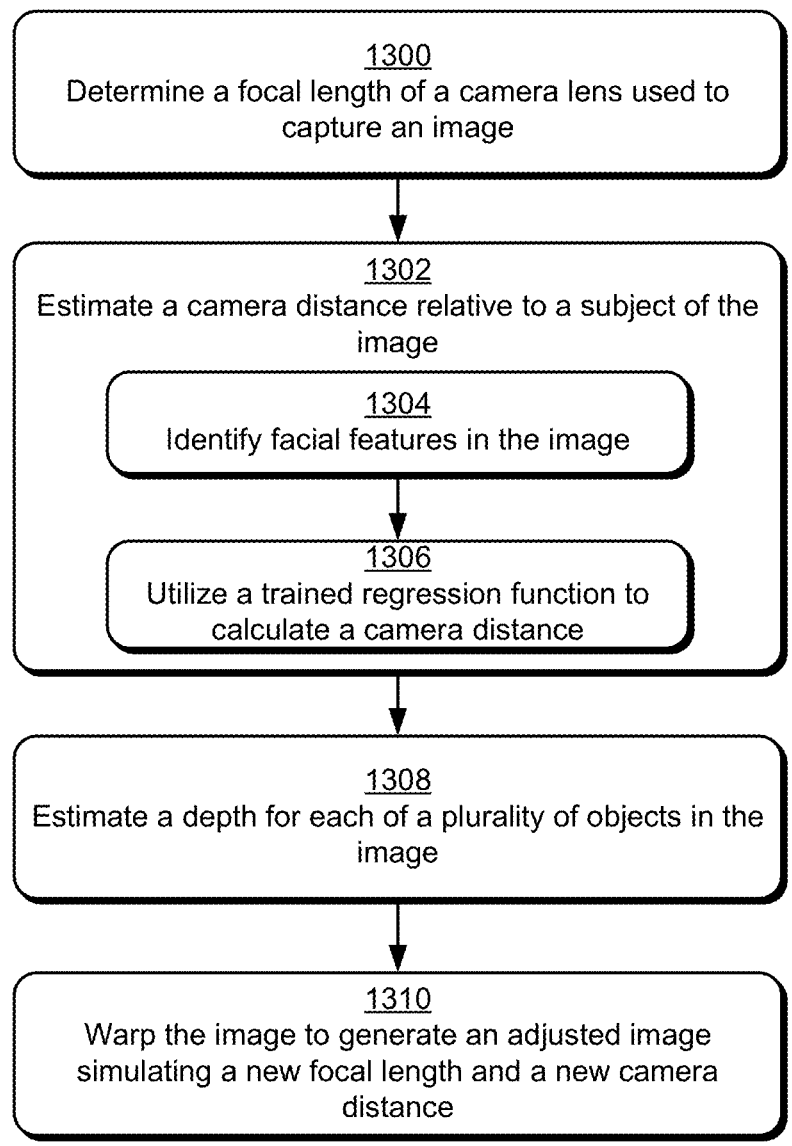
FIG. 13 is a flow diagram that describes steps in a method for warping an image to simulate a new focal length and a new camera distance in accordance with one or more implementations.

FIG. 13 is a flow diagram that describes steps in a method for warping an image to simulate a new focal length and a new camera distance in accordance with one or more implementations.

Step 1300 determines a focal length of a camera lens used to capture an image. The focal length of the camera lens may be determined by any suitable means, such as by extracting information from metadata corresponding to the image. For example, EXIF data for the image may include the 35 mm-equivalent focal length used in capturing the image. Additionally or alternatively, metadata for the image may include manufacturer and/or model information for the camera used to capture the image, and a lookup table may be utilized to determine the focal lengths of lenses used in the identified camera model. Alternatively, the focal length of the camera lens may be determined by an input such as a user input indicating the focal length and/or the camera model.

Step 1302 estimates a camera distance relative to a subject of the image. As described above with reference to FIG. 5, the module(s) 108 may utilize any number of techniques to estimate a camera distance, such as by identifying and/or locating facial features of the image in step 1304 and utilizing a trained regression function based on the located facial features to calculate a camera distance in step 1306. However, any suitable technique may be utilized and the method is not limited to utilizing facial features to determine a camera distance. For example, if distance information is known to a user, the user may simply input the distance information.

Step 1304 identifies facial features in an image. This may be performed by the feature localization module 208 of FIG. 2. and/or FIG. 3. Any feature detector may be used, such as using the Gaussian likelihood, Haar-based boosted classifier, and/or a linear logistic regressor, to perform a local search for facial features followed by an optimization method to optimize the locations of the located features. For example, the Active Shape Model, Active Appearance Models, Pictorial structure methods, convex quadratic fitting, Gaussian Mixture Model estimates, and/or a component-based discriminative search may be utilized to determine the most likely location for each of a plurality of facial features on a given image. Generally, these methods operate by generating a likelihood map for each landmark position and iteratively applying local feature detectors with global geometric constraints. Alternatively, a subspace-constrained mean shift method may be utilized to identify facial features. A subspace-constrained mean shift method uses a nonparametric representation that iteratively computes mean-shifted landmarks and applies subspace constraints until convergence is achieved. The subspace constraints are utilized to help ensure that the determined points are likely to be located at points actually on a human face.

Step 1306 utilizes a trained regression function to calculate a camera distance. This may be performed, for example, by the mesh fitting module 210 of FIG. 2 and/or FIG. 5. A regression function may be trained to learn the mapping from facial shapes to the distance to a face based on the locations of facial key points. The training of the regression function may include as input a plurality of faces, with each face including several images taken from varied and known distances. The identified facial key points are provided as an input to the regression function, and the regression function calculates the camera distance.

Step 1308 estimates a depth for each of a plurality of points in the image. The points may be 3D vertices in a 3D facial mesh. The estimation may be performed, for example, by the mesh fitting module 210 of FIG. 2 and/or FIG. 5. A 3D facial mesh may be fit to the image, including a plurality of 3D vertices. Each 3D vertex has a 3D coordinate location within the 3D facial mesh, giving depth information for each 3D vertex. The 3D coordinate location and/or depth information for each 3D vertex may be combined with the camera distance determined in step 1306 to determine distance and/or depth information for each 3D vertex with respect to the camera.

Step 1310 warps the image to generate an adjusted image simulating a new focal length and a new camera distance. For example, the determined focal length and the estimated camera distance may be utilized to create a 3D facial mesh and reproject the 3D facial mesh according to the depth information for each 3D vertex, and determine a warp map usable to warp pixels in an input image, as described above with reference to FIG. 10. One example of such warping is described below in step 1406 of FIG. 14. A subject of the image may include a face, and warping the image may include warping the face.

Figure 14:
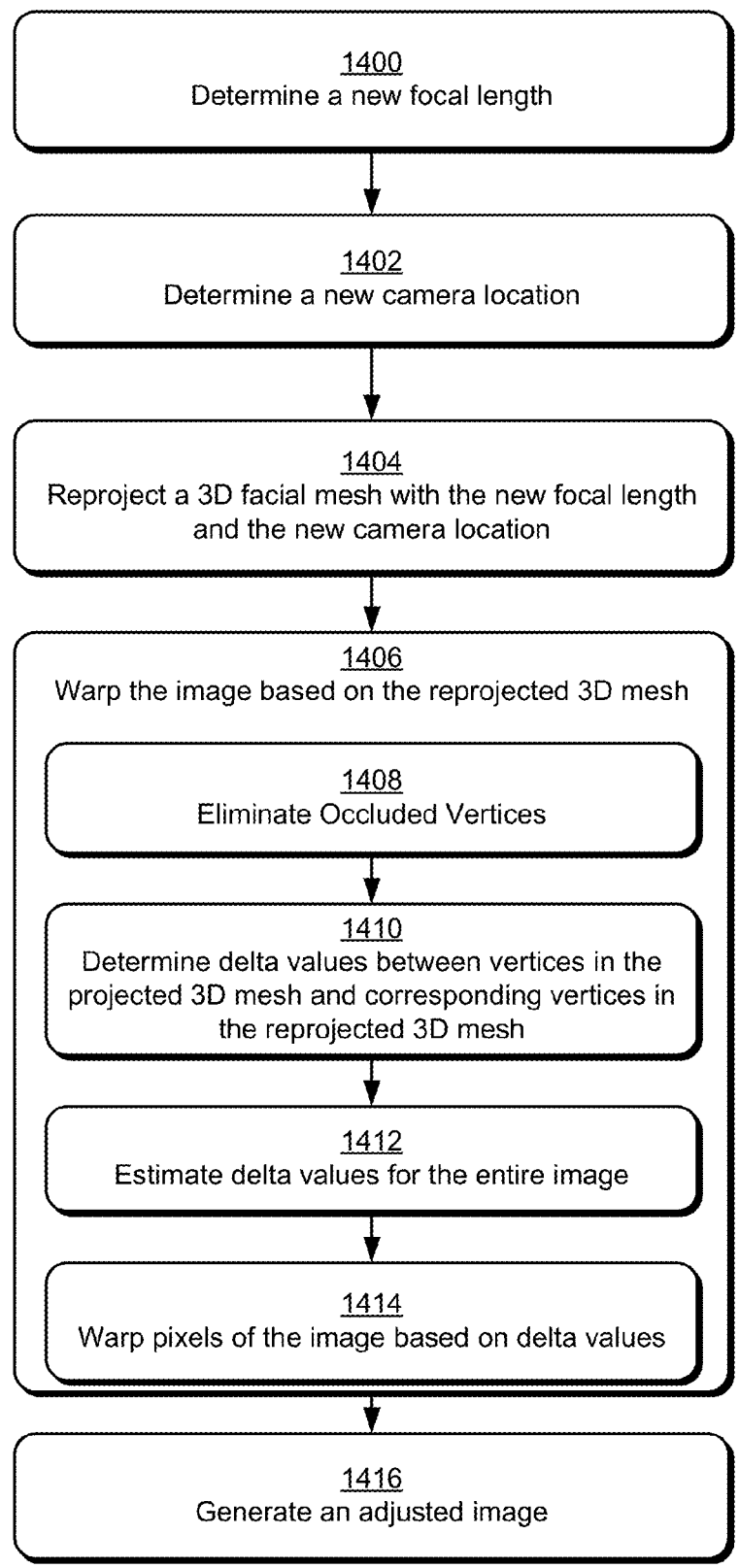
FIG. 14 is a flow diagram that describes steps in a method for warping an image based on a reprojected 3D mesh in accordance with one or more implementations.

FIG. 14 is a flow diagram that describes steps in a method for warping an image based on a reprojected 3D mesh in accordance with one or more implementations. The method, for instance, describes an example variation and/or extension of the method described above with reference to FIG. 13

Step 1400 determines a new focal length to be utilized in warping an image. The new focal length may be any desirable focal length, and may be chosen through input from a user, selected from a list of focal lengths, or may be a preset focal length. For example, a general rule of thumb in photography is that a focal length of 50 mm (35 mm-equivalent) should be used for portraits. Thus, in at least some implementations, a focal length of 50 mm (35 mm-equivalent) is utilized as the new focal length.

Step 1402 determines a new camera distance. As referenced above with respect to FIG. 8, the reprojection module 212 may virtually dolly to a new camera distance, and the new camera distance may be determined as a function of the original camera distance and the ratio of the new focal length and the original focal length.

Step 1404 reprojects a 3D facial mesh with the new focal length and the new camera distance. This may be performed, for example, by the reprojection module 212 of FIG. 2 and/or the scenario 800 of FIG. 8. A deformable 3D facial mesh may be represented by a shape vector that contains coordinates of its 3D vertices. The coordinates of the 3D vertices includes depth information for each 3D vertex, and combined with the new camera distance of step 1402 may allow the determination of a distance from the camera for each individual 3D vertex. The 3D facial mesh may be any suitable 3D model of common facial features and contours. The deformable 3D facial mesh, for instance, is fitted to an image by varying coefficients in a Principal Component Analysis model in order to minimize error between the pre-defined landmarks on the 3D face geometry and the 2D landmark points detected earlier. Subspace constraints may be applied to limit deformation of the 3D facial mesh to configurations approximating actual human faces. The 3D facial mesh is rotated, translated, and deformed until 3D vertex locations correspond as closely as possible to the 2D features from the previous step without departing from the subspace constraints. The 3D facial mesh may be reprojected, for instance, using a pinhole camera model created using the new focal length and new camera distance from steps 1400 and 1402. Using the pinhole camera model, the depth information is utilized to determine a new location of each vertex of the 3D facial mesh on an input image, thereby reprojecting the 3D facial mesh.

Step 1406 warps the image based on the reprojected 3D facial mesh. Warping the image may include eliminating occluded vertices in step 1408, determining delta values between vertices in step 1410, estimating delta values for the entire image in step 1412, and warping pixels of the image based on the delta values in step 1414.

Step 1408 eliminates occluded vertices from the reprojected 3D facial mesh. For example, occluded vertices that would cause mathematical or perspective inconsistencies are removed as described above with respect to FIG. 10. If delta values have been determined for the occluded vertices, the corresponding delta values may be eliminated as well.

Step 1410 determines delta values between the vertices in the projected 3D facial mesh and corresponding vertices in the reprojected 3D facial mesh. For example, a pinhole camera model created using the original focal length and distance is used to determine pixel coordinates for each vertex of the fitted 3D facial mesh on the input image, creating the projected 3D facial mesh. Further, a pinhole camera model created using the new focal length and the new distance is used to determine pixel coordinates for each vertex of the reprojected 3D facial mesh. Thus, a delta value for each vertex is determined based on differences in the locations of corresponding vertices in the projected 3D facial mesh and the reprojected 3D facial mesh.

Step 1412 estimates delta values for the entire image. Optionally, auxiliary data points may be added to the edges of the image, setting delta values for edge pixels of the image to be equal to the delta value of the vertex nearest to the edge. For example, delta values for edge pixels on the right edge of the image may be set equal to the delta value of the right-most vertex, delta values for edge pixels on the top edge of the image may be set equal to the delta value of the top-most vertex, and so forth. The delta values are then interpolated to generate delta values for each pixel of the image. Any suitable method of interpolation may be used, such as scattered data interpolation. For example, a linear interpolation of the mesh and auxiliary vertices' Delaunay triangulation may be performed to estimate delta values at individual pixels of the image across the entire image, including individual pixels that are outside of the 3D facial mesh and/or the reprojected 3D facial mesh.

Step 1414 warps pixels of the image based on the delta values. Using the delta values for each pixel, an inverse look up is performed to obtain output pixel values based on pixels values of the original image. A pixel value represents the color, shade, and/or brightness of a pixel, and a single pixel value may include multiple values (e.g., a pixel color may be represented as a combination of red, green, and blue, and the pixel value may include a value for 'Red', a value for 'Green', and a value for 'Blue'). For each output pixel, an inverse look up is performed using the delta values to identify a pixel in the original, unwarped image which may serve as a source for the pixel value of the output pixel. In at least some implementations, the warped pixels are cropped prior to generating an adjusted image. In some circumstances, warping the pixels may involve warping edge pixels away from an edge of the image, and a reverse look up for pixels near the edge may not yield any pixel value, thus creating 'empty' pixels near the edge of the warped image. For example, in the image 1202 of FIG. 12, such 'empty' areas can be seen in the top left, top right, bottom left, and bottom right corners of the image. In at least some implementations, these 'empty' areas of the warped image are cropped out prior to generating the adjusted image.

Step 1416 generates an adjusted image. The warped pixels, for instance, are saved in any suitable format to generate an adjusted image. The adjusted image may, for example, be displayed on a display device, stored to a storage medium, transmitted and/or communicated to another device or location, and/or passed on to one or more other modules for additional processing.

Having discussed some example procedures, consider now a discussion of an example system and device in accordance with one or more implementations.

Example System and Device

Figure 15:
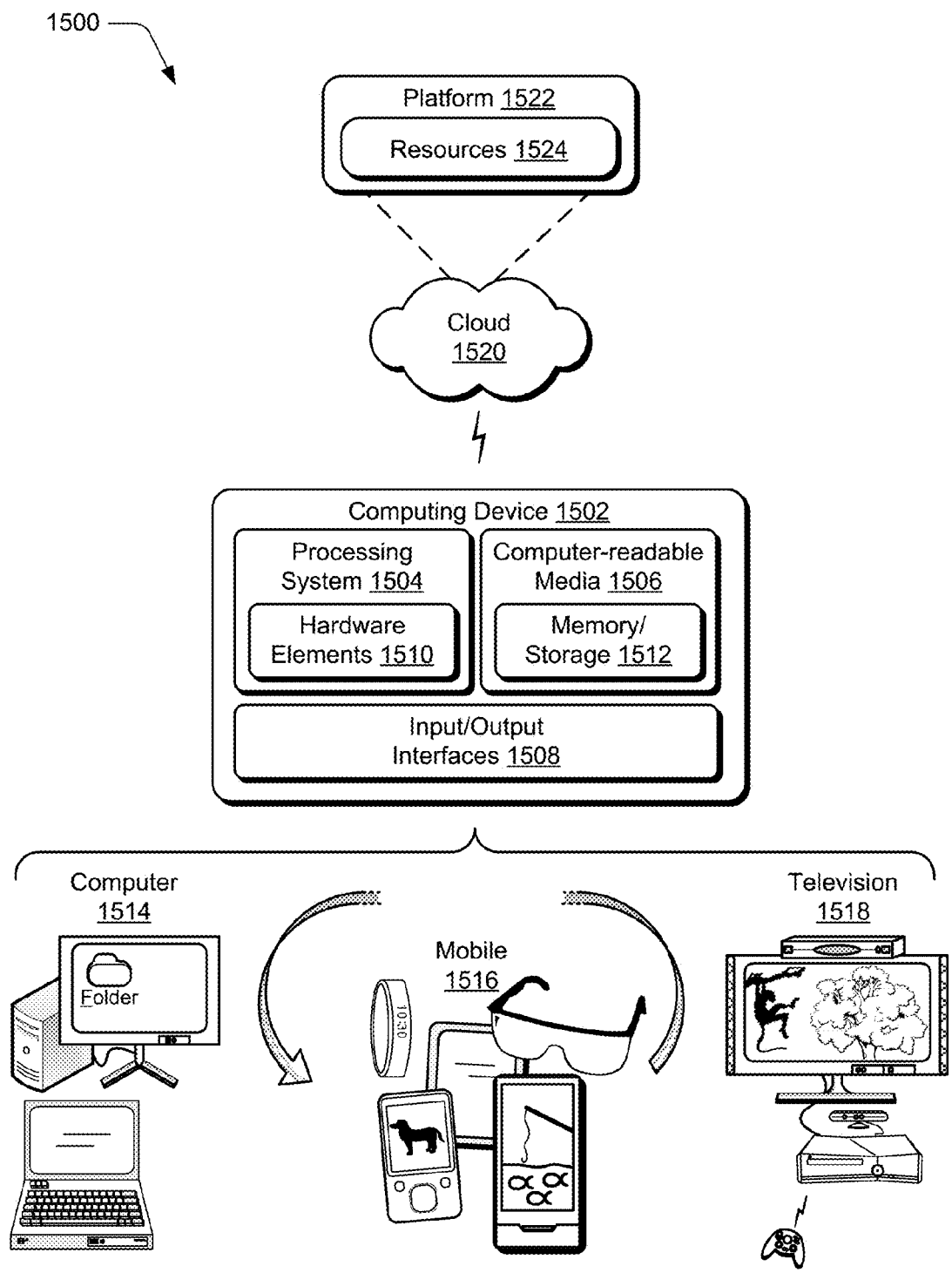
FIG. 15 illustrates an example system and computing device as described with reference to FIG. 1, which are configured to implement embodiments of techniques described herein.

FIG. 15 illustrates an example system generally at 1500 that includes an example computing device 1502 that is representative of one or more computing systems and/or devices that may implement various techniques described herein. For example, the computing device 102 discussed above with reference to FIG. 1 can be embodied as the computing device 1502. The computing device 1502 may be, for example, a server of a service provider, a device associated with the client (e.g., a client device), an on-chip system, and/or any other suitable computing device or computing system.

The example computing device 1502 as illustrated includes a processing system 1504, one or more computer-readable media 1506, and one or more I/O Interfaces 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage 1512 may include volatile media (such as random access memory (RAM)) and/or nonvolatile media (such as read only memory (ROM), Flash memory, optical disks, magnetic disks, and so forth). The memory/storage 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system. The instructions and/or functions may be executable/operable by one or more articles of manufacture (for example, one or more computing devices 1502 and/or processing systems 1504) to implement techniques, modules, and examples described herein.

As further illustrated in FIG. 15, the example system 1500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1502 may assume a variety of different configurations, such as for computer 1514, mobile 1516, and television 1518 uses. Each of these configurations includes devices that may have generally different constructs and capabilities, and thus the computing device 1502 may be configured according to one or more of the different device classes. For instance, the computing device 1502 may be implemented as the computer 1514 class of a device that includes a personal computer, desktop computer, a multi-screen computer, laptop computer, netbook, and so on.

The computing device 1502 may also be implemented as the mobile 1516 class of device that includes mobile devices, such as a mobile phone, portable music player, a wearable device, a portable gaming device, a tablet computer, a multi-screen computer, and so on. The computing device 1502 may also be implemented as the television 1518 class of device that includes devices having or connected to generally larger screens in casual viewing environments. These devices include televisions, set-top boxes, gaming consoles, and so on.

The techniques described herein may be supported by these various configurations of the computing device 1502 and are not limited to the specific examples of the techniques described herein. For example, functionalities discussed with reference to the computing device 102 may be implemented all or in part through use of a distributed system, such as over a "cloud" 1520 via a platform 1522 as described below.

The cloud 1520 includes and/or is representative of a platform 1522 for resources 1524. The platform 1522 abstracts underlying functionality of hardware (e.g., servers) and software resources of the cloud 1520. The resources 1524 may include applications and/or data that can be utilized while computer processing is executed on servers that are remote from the computing device 1502. Resources 1524 can also include services provided over the Internet and/or through a subscriber network, such as a cellular or WiFi® network.

The platform 1522 may abstract resources and functions to connect the computing device 1502 with other computing devices. The platform 1522 may also serve to abstract scaling of resources to provide a corresponding level of scale to encountered demand for the resources 1524 that are implemented via the platform 1522. Accordingly, in an interconnected device embodiment, implementation of functionality described herein may be distributed throughout the system 1500. For example, the functionality may be implemented in part on the computing device 1502 as well as via the platform 1522 that abstracts the functionality of the cloud 1520.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environments 100 and 200.

CONCLUSION

Techniques for focal length warping are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A method comprising:
   determining a focal length of a camera lens used to capture an image that includes a plurality of pixels;
   estimating a depth for each of a plurality of points in the image; and
   warping the image by utilizing the determined focal length and the estimated depths to generate an adjusted image that simulates a different focal length by:
   fitting a 3D mesh to features of a subject of the image;
   creating a reprojected 3D mesh by reprojecting the 3D mesh according to the estimated depths;
   determining first delta values at pixels corresponding to vertices in the reprojected 3D mesh based on differences between vertices in the 3D mesh and corresponding vertices in the reprojected 3D mesh;
   determining second delta values at individual pixels of the image outside of the reprojected 3D mesh by performing interpolation on the first delta values; and
   warping the image based on the first delta values and the second delta values.

2. The method of claim 1, wherein the image comprises an image of a face, and wherein said warping comprises warping the image of the face.

3. The method of a claim 1, wherein the image comprises an image of a face, and wherein said estimating depths comprises:
   locating facial features in the image of the face; and
   calculating the depths by utilizing a regression function based on the located facial features.

4. The method of claim 1, wherein the subject of the image is a face, wherein fitting the 3D mesh includes fitting the 3D mesh to facial features of the face, wherein said warping the image further comprises determining a simulated camera distance as a function of the focal length of the camera lens used to capture the image, the different focal length, and the estimated depths, and wherein said creating a reprojected 3D mesh includes reprojecting the 3D mesh according to the different focal length, the simulated camera distance, and the estimated depths.

5. The method of claim 1, wherein the subject of the image is a face, wherein the fitting the 3D mesh includes fitting the 3D mesh to facial features of the face, wherein said warping the image further comprises determining a simulated camera distance as a function of the estimated depths and a ratio of the different focal length to the focal length of the camera lens used to capture the image, and wherein said creating a reprojected 3D mesh includes reprojecting the 3D mesh according to the different focal length, the simulated camera distance, and the estimated depths.

6. The method of claim 1, wherein the subject of the image is a face, wherein the fitting the 3D mesh includes fitting the 3D mesh to facial features of the face, wherein said warping the image further comprises determining a simulated camera distance as a function of the focal length of the camera lens used to capture the image, the different focal length, and the estimated depths wherein said creating a reprojected 3D mesh includes reprojecting the 3D mesh according to the different focal length, the simulated camera distance, and the estimated depths and wherein said warping the image includes generating output pixel values using the first delta values and the second delta values to perform an inverse look up against pixel values of the image.

7. The method of claim 1, wherein the subject of the image is a face, wherein the fitting the 3D mesh includes fitting the 3D mesh to facial features of the face, wherein said warping the image further comprises determining a simulated camera distance as a function of the focal length of the camera lens used to capture the image, the different focal length, and the estimated depths wherein said creating a reprojected 3D mesh includes reprojecting the 3D mesh according to the different focal length, the simulated camera distance, and the estimated depths; and wherein said warping further includes eliminating occluded vertices in the reprojected 3D mesh and delta values corresponding to the occluded vertices.

8. The method of claim 1, wherein the subject of the image is a face, wherein fitting the 3D mesh includes fitting the 3D mesh to facial features of the face, wherein said warping the image further comprises determining a simulated camera distance as a function of the focal length of the camera lens used to capture the image, the different focal length, and the estimated depths wherein said creating a reprojected 3D mesh includes reprojecting the 3D mesh according to the different focal length, the simulated camera distance, and the estimated depths, wherein the determining second delta values includes:
setting second delta values at pixels of a left edge of the image equal to a delta value of a pixel corresponding to a left-most vertex of the 3D mesh, setting delta values at pixels of a right edge of the image equal to a delta value of a pixel corresponding to a right-most vertex of the 3D mesh, setting delta values at pixels of a top edge of the image equal to a delta value of a pixel corresponding to a top-most vertex of the 3D mesh, and setting delta values at pixels of a bottom edge of the image equal to a delta value of a pixel corresponding to a bottom-most vertex of the 3D mesh;
wherein the warping further comprises determining third delta values at individual pixels of the image outside of the reprojected 3D mesh by performing interpolation on the first delta values and the second delta values; and wherein warping the image is based on the first delta values, the second delta values, and the third delta values.

9. A system comprising:
one or more processors; and
one or more computer-readable media storing processor-executable instructions that, responsive to execution by the one or more processors, cause the device to perform operations including:
determining a focal length of a camera lens used to capture an image that includes a plurality of pixels;
estimating a depth for each of a plurality of points in the image; and
warping the image by utilizing the determined focal length and the estimated depths to generate an adjusted image that simulates a different focal length by:
fitting a 3D mesh to features of a subject of the image;
creating a reprojected 3D mesh by reprojecting the 3D mesh according to the estimated depths;
determining first delta values at pixels corresponding to vertices in the reprojected 3D mesh based on differences between vertices in the 3D mesh and corresponding vertices in the reprojected 3D mesh;
determining second delta values at individual pixels of the image outside of the reprojected 3D mesh by performing interpolation on the first delta values; and
warping the image based on the first delta values and the second delta values.

10. The system of claim 9, wherein the subject of the image is a face, wherein fitting the 3D mesh includes fitting the 3D mesh to facial features of the face, wherein said warping the image further comprises determining a simulated camera distance as a function of the focal length of the camera lens used to capture the image, the different focal length, and the estimated depths, and wherein said creating a reprojected 3D mesh includes reprojecting the 3D mesh according to the different focal length, the simulated camera distance, and the estimated depths.

11. The system of claim 9, wherein the subject of the image is a face, wherein the fitting the 3D mesh includes fitting the 3D mesh to facial features of the face, wherein said warping the image further comprises determining a simulated camera distance as a function of the estimated depths and a ratio of the different focal length to the focal length of the camera lens used to capture the image, and wherein said creating a reprojected 3D mesh includes reprojecting the 3D mesh according to the different focal length, the simulated camera distance, and the estimated depths.

12. The system of claim 9, wherein the subject of the image is a face, wherein the fitting the 3D mesh includes fitting the 3D mesh to facial features of the face, wherein said warping the image further comprises determining a simulated camera distance as a function of the focal length of the camera lens used to capture the image, the different focal length, and the estimated depths wherein said creating a reprojected 3D mesh includes reprojecting the 3D mesh according to the different focal length, the simulated camera distance, and the estimated depths and wherein said warping the image includes generating output pixel values using the first delta values and the second delta values to perform an inverse look up against pixel values of the image.

13. The system of claim 9, wherein the subject of the image is a face, wherein the fitting the 3D mesh includes fitting the 3D mesh to facial features of the face, wherein said warping the image further comprises determining a simulated camera distance as a function of the focal length of the camera lens used to capture the image, the different focal length, and the estimated depths wherein said creating a reprojected 3D mesh includes reprojecting the 3D mesh according to the different focal length, the simulated camera distance, and the estimated depths and wherein said warping further includes eliminating occluded vertices in the reprojected 3D mesh and delta values corresponding to the occluded vertices.

14. The system of claim 9, wherein the subject of the image is a face, wherein fitting the 3D mesh includes fitting the 3D mesh to facial features of the face, wherein said warping the image further comprises determining a simulated camera distance as a function of the focal length of the camera lens used to capture the image, the different focal length, and the estimated depths wherein said creating a reprojected 3D mesh includes reprojecting the 3D mesh according to the different focal length, the simulated camera distance, and the estimated depths, wherein determining the second delta values includes:

setting second delta values at pixels of a left edge of the image equal to a delta value of a pixel corresponding to a left-most vertex of the 3D mesh, setting delta values at pixels of a right edge of the image equal to a delta value of a pixel corresponding to a right-most vertex of the 3D mesh, setting delta values at pixels of a top edge of the image equal to a delta value of a pixel corresponding to a top-most vertex of the 3D mesh, and setting delta values at pixels of a bottom edge of the image equal to a delta value of a pixel corresponding to a bottom-most vertex of the 3D mesh;

wherein the warping further comprises determining third delta values at individual pixels of the image outside of the reprojected 3D mesh by performing interpolation on the first delta values and the second delta values; and wherein warping the image is based on the first delta values, the second delta values, and the third delta values.

15. A method comprising:
determining a focal length of a camera lens used to capture an image, the image comprising a plurality of pixels;
estimating a camera distance relative to a subject of the image by identifying predefined features in the image and fitting a 3D model to the predefined features, the 3D model including a plurality of 3D vertices;
estimating a depth for each of the plurality of 3D vertices;
determining a different camera distance as a function of the focal length of the camera lens used to capture the image, a different focal length, and the estimated camera distance;
reprojecting the 3D model with the different focal length and the different camera distance to generate a reprojected 3D model based on the estimated depth for each of the plurality of 3D vertices;
eliminating occluded vertices from the reprojected 3D model;
determining first delta values at pixels corresponding to vertices in the reprojected 3D model based on differences between vertices in the 3D model and corresponding vertices in the reprojected 3D model;
estimating second delta values for individual pixels outside of the 3D model by performing interpolation on the first delta values; and
warping the image based on the first delta values and the second delta values to generate an adjusted image that simulates the different focal length and the different camera distance.

16. The method of claim 15, wherein said reprojecting the 3D model further comprises utilizing a pinhole camera model to determine two-dimensional coordinates on the image for individual 3D vertices of the 3D model.

17. The method of claim 15, wherein said estimating a delta value for individual pixels comprises performing linear interpolation of a Delaunay triangulation for the determined delta values to determine a delta value at respective locations of the individual pixels.

18. The method of claim 15, further comprising cropping the adjusted image.

19. The method of claim 15, wherein the image comprises an image of a face, and wherein said warping comprises warping the image of the face.

20. The method of claim 15, wherein the image comprises an image of a face, wherein fitting the 3D mesh includes fitting the 3D mesh to facial features of the face, and wherein said warping comprises warping the image of the face.

* * * * *